Patented Feb. 3, 1925.

1,525,058

UNITED STATES PATENT OFFICE.

FREDERICK M. BECKET, OF NEW YORK, N. Y., ASSIGNOR TO ELECTRO METALLURGICAL COMPANY, OF NEW YORK, N. Y., A CORPORATION OF WEST VIRGINIA.

WELDING ROD.

No Drawing.   Application filed September 25, 1922.   Serial No. 590,513.

*To all whom it may concern:*

Be it known that I, FREDERICK M. BECKET, a citizen of the United States, residing at New York, in the county of New York and State of New York, have invented certain new and useful Improvements in Welding Rods, of which the following is a specification.

This invention relates to the welding and brazing of copper and copper alloys, and has for its object the improvement of joints of this character.

This object is attained by using in the welding or brazing operation, welding rods of compositions which are novel for this purpose, as more fully described below.

The compositions of my invention are especially adapted for the welding of ordinary copper. This material may be welded with a composition such as copper containing a small percentage of silicon, or of phosphorus, in such manner that the added metal is homogeneous and strong, and apparently well bonded to the base metal, yet without producing a weld of satisfactory strength. The point of failure of such welds frequently seems to be in the base metal itself, indicating a deterioration of the latter during the welding operation. Such deterioration may be explained in the following way:

Ordinary commercial copper contains appreciable amounts of cuprous oxid. The presence of this substance appears to be advantageous when bismuth, arsenic or antimony are also present, and when the copper is to be used without heating under reducing conditions during or after fabrication. Heating ordinary copper in the presence of reducing gases seems to result in the reduction of some of the contained cuprous oxid to copper, which may occupy less space than the oxid from which it is formed, thereby leaving voids in the metal and weakening it. Gases formed during the reduction of the oxid may also create or enlarge voids by their expansive action.

Furthermore, ordinary copper, on cooling from a molten condition, gives off gases which have been dissolved by the molten material, or formed in it, and the metal is thus made porous and weak.

In the welding of ordinary copper with the blowpipe, the metal adjacent the weld which is superficially melted and in contact with the reducing gases of the flame, appears to become weakened in the manner described. Furthermore, there is at times formed on the surface of the copper, just as it is melting, a lacy network of refractory material which hinders the melting of the metal and its joining with the added metal. I also attribute this network of slag to the presence of cuprous oxid in the base metal.

I have found that when a copper welding rod containing suitable proportions of silicon and manganese is used for welding ordinary copper, not only is the added metal homogeneous and well bonded to the base metal, but a protection of the latter from deterioration of the kind referred to is also indicated. The function of the manganese in the composition is not entirely clear, but its beneficial effect is readily observable, especially when welding ordinary copper. The oxidation product of manganese and the silica, formed by oxidation during the welding operation, probably combine to form a highly fluid slag which serves to protect the heated metal. The presence of manganese also appears to prevent in some way the formation of the objectionable lacy network of infusible material mentioned above.

My tests indicate that up to 0.80% silicon together with up to 1.00% manganese, gives the best results, about 0.60% silicon and about 0.80% manganese being preferred. The silicon should usually exceed 0.30% and the manganese 0.50%. The manganese and silicon may, however, be present in larger or smaller proportions than the range prescribed above. For example, larger proportions might be used where necessary to produce a filling metal to match the color of a certain base metal, and where high strength and ductility were not essential.

The presence in the welding rods of other elements than copper, silicon and manganese, is not precluded, and may at times be advantageous.

While the compositions described above are especially adapted for the welding of copper containing oxid, they are also useful in welding deoxidized copper, and oxid-free alloys of copper with other metals, such as zinc or tin, especially where the content of such other metals is small. Regardless of whether the base metal contains oxid or not, the compositions described give an added metal of high strength and ductility, and are easy to manipulate in the welding operation. By varying the content of silicon and manganese, the color of the added metal may be considerably modified, thus permitting matching the colors of various copper alloys.

The term "welding rod" as used in the appended claims, imports a member intended to be used with a welding blowpipe or an electric arc, and from which metal may be deposited at any desired point. Such a member is not limited to any particular shape or dimensions.

I claim:—

1. A welding rod consisting predominantly of copper, and containing substantial amounts of silicon and of manganese.

2. A welding rod consisting predominantly of copper, and containing silicon and manganese, the silicon being present in amount in excess of about 0.30% and the manganese being present in amount in excess of about 0.50%.

3. A welding rod consisting predominantly of copper, and containing silicon and manganese, the silicon being present in amount between 0.30% and 0.80%, and the manganese being present in amount between 0.50% and 1.00%.

4. A welding rod consisting predominantly of copper, and containing silicon and manganese, the silicon comprising about 0.6% of the rod, and the manganese comprising about 0.8% of the rod.

In testimony whereof, I affix my signature.

FREDERICK M. BECKET.